UNITED STATES PATENT OFFICE.

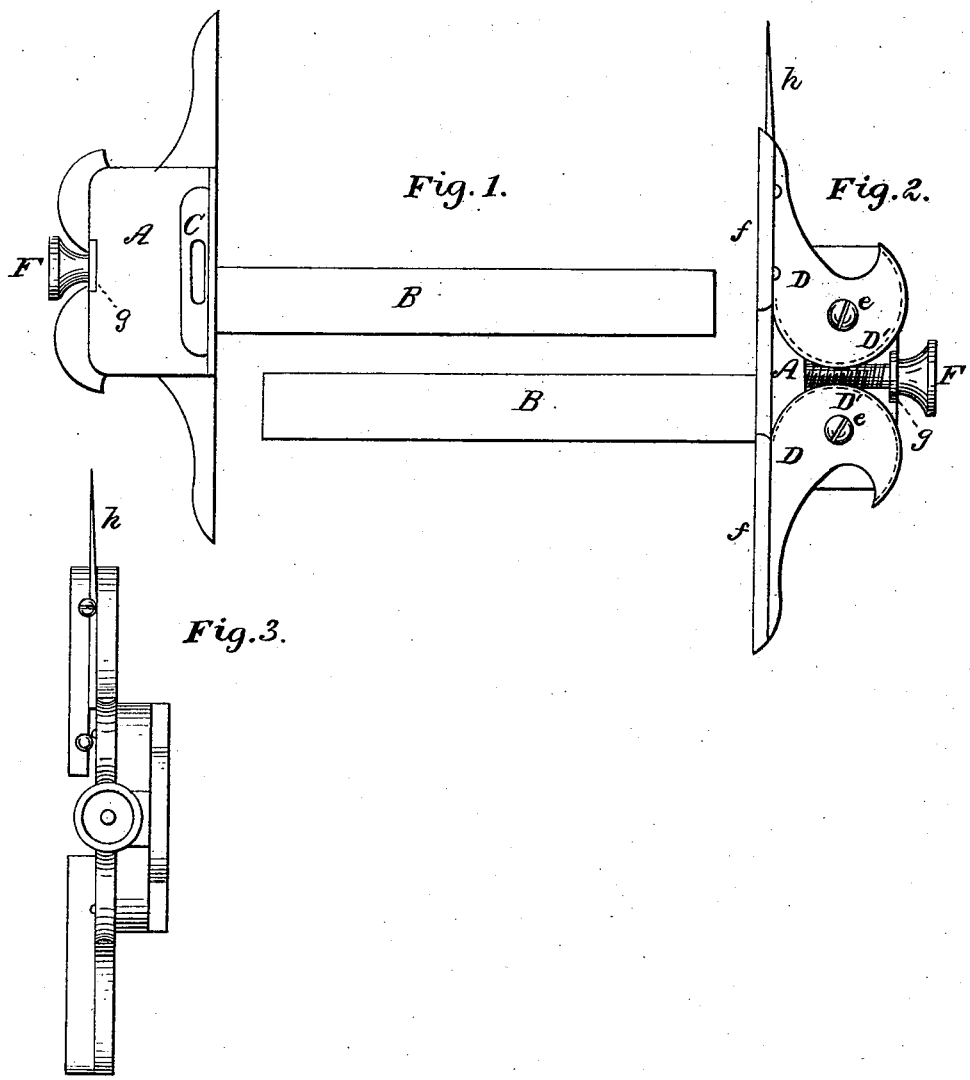

E. B. FOSTER AND JOHN G. WITT, OF ELMIRA, NEW YORK.

IMPROVEMENT IN ADJUSTABLE SQUARE AND BEVEL.

Specification forming part of Letters Patent No. 82,933, dated October 13, 1868.

*To all whom it may concern:*

Be it known that we, E. B. FOSTER and JOHN G. WITT, of Elmira, in the county of Chemung and State of New York, have invented a new and Improved Combined Square and Bevel; and we do hereby declare that the following is a full, clear, and exact description thereof, which will enable those skilled in the art to make and use the same, reference being had to the accompanying drawings, forming part of this specification.

The object of this invention is to furnish, in one article or tool, a combination of various useful tools which are indispensable in the mechanic arts; and it consists in so constructing the article that it may be used as a center-square, a surface-gage, a bevel, a try-square, a plumb-rule, and level.

Figure 1 represents a longitudinal view of the article, showing a spirit-level upon one side of the head of the square. Fig. 2 is a view of the other side of the same, showing the adjustable wings and the screw by which they are operated. Fig. 3 is an end view of the same.

Similar letters of reference indicate corresponding parts.

A is the head of the square. B is the tongue or rule. C is a spirit-level, which is set in the head, so as to be used as a level and a plumb, in connection with the rule of the square. D D are the adjustable wings, attached to the head by center pivot-screws $e\ e$. The inner ends of these wings form circles D', of which the pivots $e\ e$ are the centers. $f\ f$ are projecting flanges on the arms.

A half screw-thread is cut on the periphery of each of these circles, as seen in the end view, Fig. 3.

F is a screw with a milled head, attached to the head A by a bracket or stud, $g$, through which it passes, and the screw-thread of which is made to engage with each of the half-threads on the circles D'. The screw F being in a fixed position, it will be seen that by revolving it the wings D will be thrown inward toward the tongue B, or outward from the tongue, so that any desired bevel or angle may be obtained.

The action of the screw and the circles D' being that of a worm-gear and perpetual screw, the wings will remain fixed wherever placed.

This action of the arms is very convenient for finding centers of circles and other figures, and the head adapts it to be used as a surface-gage.

In one of the arms D a sliding awl is arranged, as seen at $h$. When not wanted it is drawn back out of the way.

The movement of the wings must be uniform, and, being adjustable to any position, two angles are described, either acute or obtuse, so that the operator has at his command at the same time a right angle and two obtuse or acute angles, as may be desired.

Having thus described our invention, we claim as new and desire to secure by Letters Patent—

The combination, with a try or T square, of the wings D D and the screw F, for adjusting the angle of the same, substantially as described.

E. B. FOSTER.
JOHN G. WITT.

Witnesses:
CHAS. G. LAPPE,
LAFAYETTE STEVENS.